United States Patent
Kowalevicz et al.

(10) Patent No.: US 11,353,774 B2
(45) Date of Patent: Jun. 7, 2022

(54) METHODS AND APPARATUS FOR CAVITY LENGTH TUNING FOR OPERATING POINT OPTIMIZATION

(71) Applicant: RAYTHEON COMPANY, Waltham, MA (US)

(72) Inventors: Andrew Kowalevicz, Arlington, VA (US); Benjamin P. Dolgin, Alexandria, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/929,798

(22) Filed: Jul. 15, 2020

(65) Prior Publication Data

US 2021/0021351 A1  Jan. 21, 2021

Related U.S. Application Data

(60) Provisional application No. 62/874,156, filed on Jul. 15, 2019.

(51) Int. Cl.
*G02F 2/00* (2006.01)
*H04B 10/556* (2013.01)
(Continued)

(52) U.S. Cl.
CPC ............... *G02F 2/00* (2013.01); *H04B 10/11* (2013.01); *H04B 10/516* (2013.01);
(Continued)

(58) Field of Classification Search
CPC .... H04B 10/671; H04B 10/516; H04B 10/11; H04B 10/5561; H04B 10/677;
(Continued)

(56) References Cited

U.S. PATENT DOCUMENTS

| 4,172,663 A | 10/1979 | Byer et al. |
| 4,417,964 A | 11/1983 | Wolfrum et al. |

(Continued)

FOREIGN PATENT DOCUMENTS

| EP | 0426357 A2 | 5/1991 |
| JP | H06265832 A | 9/1994 |

(Continued)

OTHER PUBLICATIONS

International Search Report and Written Opinion of International Patent Application No. PCT/US2020/028941 dated Sep. 23, 2020.
(Continued)

*Primary Examiner* — Abbas H Alagheband
(74) *Attorney, Agent, or Firm* — Lando & Anastasi, LLP

(57) ABSTRACT

Disclosed are optical communications systems and optical receivers including one or more optical cavity resonators. In particular, disclosed are methods and apparatus that allow for beam pointing to be maintained while permitting the receiver to tune the optical resonator to suit the wavelength, data rate and modulation format of the incoming optical signal, without requiring a coherent receiver or adaptive optics in addition to optical resonators.

22 Claims, 7 Drawing Sheets

(51) Int. Cl.
    *H04B 10/67*           (2013.01)
    *H04B 10/11*           (2013.01)
    *H04B 10/516*         (2013.01)

(52) U.S. Cl.
    CPC ....... *H04B 10/5561* (2013.01); *H04B 10/671* (2013.01); *H04B 10/677* (2013.01); *G02F 2203/15* (2013.01)

(58) Field of Classification Search
    CPC ..... H04B 10/676; G02F 2/00; G02F 2203/15; G02B 17/004
    USPC ........................................................ 398/118
    See application file for complete search history.

(56) References Cited

U.S. PATENT DOCUMENTS

| | | | |
|---|---|---|---|
| 4,980,892 | A | 12/1990 | Cunningham et al. |
| 5,777,768 | A | 7/1998 | Korevaar |
| 5,896,005 | A | 4/1999 | Gurvitch et al. |
| 5,912,748 | A | 6/1999 | Wu et al. |
| 6,466,707 | B1 | 10/2002 | Dawes et al. |
| 6,816,315 | B1 | 11/2004 | Ai et al. |
| 6,868,237 | B2 | 3/2005 | Willebrand et al. |
| 6,882,764 | B1 | 4/2005 | Deng et al. |
| 7,039,278 | B1 | 5/2006 | Huang et al. |
| 7,158,281 | B2 | 1/2007 | Chen et al. |
| 7,361,884 | B2 | 4/2008 | Tanaka et al. |
| 7,711,441 | B2 | 5/2010 | Tillotson |
| 7,907,648 | B2 * | 3/2011 | Matsui ............... H01S 5/06258 372/26 |
| 8,427,649 | B2 | 4/2013 | Hays et al. |
| 8,929,408 | B1 * | 1/2015 | Diels .................. H01S 3/10046 372/18 |
| 9,018,575 | B2 | 4/2015 | Kowalevicz et al. |
| 9,091,853 | B2 | 7/2015 | Longeaud |
| 9,165,963 | B2 | 10/2015 | Kowalevicz et al. |
| 9,171,219 | B2 | 10/2015 | Kowalevicz |
| 9,323,034 | B2 | 4/2016 | Dolgin |
| 9,400,414 | B2 | 7/2016 | Kowalevicz |
| 9,451,185 | B2 | 9/2016 | Dolgin et al. |
| 9,503,660 | B2 | 11/2016 | Kowalevicz et al. |
| 9,535,245 | B1 | 1/2017 | Kowalevicz |
| 9,538,096 | B2 | 1/2017 | Dolgin |
| 9,887,779 | B2 | 2/2018 | Kowalevicz |
| 9,973,281 | B2 | 5/2018 | Kowalevicz et al. |
| 9,989,700 | B1 | 6/2018 | Ayliffe et al. |
| 10,164,765 | B2 | 12/2018 | Dolgin et al. |
| 10,177,856 | B2 | 1/2019 | Kowalevicz et al. |
| 10,205,526 | B2 | 2/2019 | Kowalevicz |
| 10,225,020 | B2 | 3/2019 | Dolgin et al. |
| 10,243,670 | B2 | 3/2019 | Kowalevicz et al. |
| 10,243,673 | B2 | 3/2019 | Dolgin et al. |
| 10,250,292 | B2 | 4/2019 | Graceffo et al. |
| 10,256,917 | B2 | 4/2019 | Dolgin et al. |
| 10,305,602 | B2 | 5/2019 | Dolgin et al. |
| 10,313,022 | B2 | 6/2019 | Dolgin et al. |
| 10,340,965 | B2 | 7/2019 | Dolgin et al. |
| 10,374,743 | B2 | 8/2019 | Dolgin et al. |
| 10,378,880 | B2 | 8/2019 | Dolgin et al. |
| 10,432,315 | B2 * | 10/2019 | Chen .................... G02F 1/0121 |
| 10,498,464 | B2 | 12/2019 | Graceffo et al. |
| 10,530,494 | B2 | 1/2020 | Dolgin et al. |
| 10,554,306 | B1 | 2/2020 | Graceffo et al. |
| 10,571,774 | B2 | 2/2020 | Graceffo et al. |
| 10,637,580 | B2 | 4/2020 | Dolgin et al. |
| 10,686,533 | B2 | 6/2020 | Dolgin et al. |
| 10,714,251 | B2 | 7/2020 | Dolgin et al. |
| 10,826,603 | B1 | 11/2020 | Kowalevicz et al. |
| 10,924,189 | B2 | 2/2021 | Kowalevicz et al. |
| 11,012,160 | B2 | 5/2021 | Kowalevicz et al. |
| 11,101,896 | B2 | 8/2021 | Kowalevicz et al. |
| 11,133,873 | B1 | 9/2021 | Kowalevicz et al. |
| 11,159,244 | B2 | 10/2021 | Graceffo et al. |
| 11,159,245 | B2 | 10/2021 | Kowalevicz et al. |
| 2002/0030439 | A1 | 3/2002 | Gurvitch et al. |
| 2002/0122614 | A1 | 9/2002 | Zhou et al. |
| 2002/0171908 | A1 * | 11/2002 | Copner .............. G02B 6/29358 359/278 |
| 2004/0013437 | A1 | 1/2004 | Wiltsey et al. |
| 2004/0080832 | A1 | 4/2004 | Singh |
| 2004/0080834 | A1 | 4/2004 | Thompson |
| 2005/0014472 | A1 | 1/2005 | Cox et al. |
| 2006/0140548 | A1 | 6/2006 | Shin et al. |
| 2006/0159135 | A1 | 7/2006 | Cliche et al. |
| 2006/0182154 | A1 * | 8/2006 | Tanaka ..................... H01S 3/139 37/9 |
| 2006/0262396 | A1 * | 11/2006 | Smith .................. G02B 6/2713 359/489.07 |
| 2007/0076282 | A1 | 4/2007 | Kourogi et al. |
| 2007/0171504 | A1 | 7/2007 | Fujimori |
| 2009/0210191 | A1 | 8/2009 | Rogers et al. |
| 2010/0135670 | A1 | 6/2010 | Amadeo et al. |
| 2010/0253948 | A1 | 10/2010 | Strandjord et al. |
| 2011/0242290 | A1 | 10/2011 | Arai |
| 2011/0273758 | A1 | 11/2011 | Wang et al. |
| 2012/0147361 | A1 | 6/2012 | Mochizuki et al. |
| 2012/0154542 | A1 | 6/2012 | Katz et al. |
| 2013/0099140 | A1 | 4/2013 | Nakarai et al. |
| 2013/0126755 | A1 | 5/2013 | Kemnitz |
| 2013/0278933 | A1 * | 10/2013 | Nozawa ............... G02B 26/001 356/419 |
| 2014/0240711 | A1 * | 8/2014 | Matsushita ................ G01J 3/26 356/451 |
| 2014/0314406 | A1 * | 10/2014 | Zerbe ..................... H04J 14/02 398/38 |
| 2016/0043794 | A1 | 2/2016 | Ashrafi et al. |
| 2016/0047987 | A1 | 2/2016 | Du et al. |
| 2016/0064894 | A1 | 3/2016 | Takiguchi et al. |
| 2016/0209643 | A1 | 7/2016 | Tsikouras et al. |
| 2016/0259185 | A1 | 9/2016 | Osumi et al. |
| 2016/0349284 | A1 | 12/2016 | Pradhan et al. |
| 2016/0357189 | A1 | 12/2016 | Barrows et al. |
| 2016/0363648 | A1 | 12/2016 | Mindell et al. |
| 2017/0299882 | A1 | 10/2017 | New et al. |
| 2018/0019807 | A1 | 1/2018 | Hreha et al. |
| 2018/0054259 | A1 | 2/2018 | Kowalevicz et al. |
| 2018/0091227 | A1 | 3/2018 | Dolgin et al. |
| 2018/0091228 | A1 * | 3/2018 | Kowalevicz ............. G02B 5/28 |
| 2018/0091230 | A1 | 3/2018 | Dolgin et al. |
| 2018/0091232 | A1 * | 3/2018 | Dolgin ................ H01S 3/08031 |
| 2018/0102853 | A1 * | 4/2018 | Dolgin ..................... G02F 2/00 |
| 2018/0145764 | A1 | 5/2018 | Dolgin et al. |
| 2018/0145765 | A1 * | 5/2018 | Kowalevicz ......... H04B 10/615 |
| 2018/0167145 | A1 * | 6/2018 | Dolgin ................... H04B 10/11 |
| 2018/0212682 | A1 * | 7/2018 | Chen ................... H04B 10/506 |
| 2018/0234231 | A1 | 8/2018 | Dolgin et al. |
| 2018/0275050 | A1 | 9/2018 | Iguchi et al. |
| 2018/0367223 | A1 | 12/2018 | Graceffo et al. |
| 2019/0007091 | A1 | 1/2019 | Graceffo et al. |
| 2019/0064629 | A1 | 2/2019 | Abouraddy et al. |
| 2019/0158208 | A1 | 5/2019 | Dolgin et al. |
| 2019/0208183 | A1 | 7/2019 | Schmidt et al. |
| 2019/0257990 | A1 | 8/2019 | Hunter et al. |
| 2019/0295264 | A1 | 9/2019 | Petilli |
| 2019/0305853 | A1 | 10/2019 | Dolgin et al. |
| 2019/0319714 | A1 | 10/2019 | Kowalevicz et al. |
| 2019/0331941 | A1 | 10/2019 | Coolbaugh et al. |
| 2020/0096504 | A1 | 3/2020 | Kawata et al. |
| 2020/0136727 | A1 | 4/2020 | Graceffo et al. |
| 2020/0278272 | A1 | 9/2020 | Kasahara et al. |
| 2020/0371328 | A1 | 11/2020 | Kowalevicz et al. |
| 2020/0403709 | A1 | 12/2020 | Graceffo et al. |
| 2020/0409189 | A1 | 12/2020 | Graceffo et al. |
| 2021/0006336 | A1 | 1/2021 | Kowalevicz et al. |
| 2021/0021449 | A1 | 1/2021 | Graceffo et al. |
| 2021/0021775 | A1 | 1/2021 | Lee |
| 2021/0041515 | A1 | 2/2021 | Dolgin |
| 2021/0099232 | A1 | 4/2021 | Graceffo et al. |
| 2021/0099234 | A1 | 4/2021 | Graceffo et al. |
| 2021/0105073 | A1 | 4/2021 | Graceffo et al. |

(56) References Cited

U.S. PATENT DOCUMENTS

2021/0126715 A1    4/2021   Graceffo et al.
2021/0314071 A1   10/2021   Graceffo et al.

FOREIGN PATENT DOCUMENTS

WO        8500484 A1   1/1985
WO    2007016537 A2   2/2007

OTHER PUBLICATIONS

Invitation to Pay Additional Fees from the International Searching Authority in International Patent Application No. PCT/US2020/042160 dated Oct. 16, 2020.
International Search Report and Written Opinion of International Patent Application No. PCT/US2020/040751 dated Oct. 19, 2020.
International Search Report and Written Opinion in International Patent Application No. PCT/US2020/042160 dated Dec. 7, 2020.
Ball, D.W., "Field Guide to Spectroscopy," SPIE Press, Bellingham, WA (2006), https://spie.org/publications/fg08_p13_index_of_refraction?SSO=1.

* cited by examiner

METHODS AND APPARATUS FOR CAVITY LENGTH TUNING FOR OPERATING POINT OPTIMIZATION

CROSS-REFERENCE TO RELATED APPLICATION

This application claims priority under 35 U.S.C. § 119(e) to U.S. Provisional Application Ser. No. 62/874,156, titled "METHODS AND APPARATUS FOR CAVITY LENGTH TUNING FOR OPERATING POINT OPTIMIZATION," filed on Jul. 15, 2019, which is hereby incorporated by reference in its entirety.

BACKGROUND

Many optical communication systems manipulate light waves to carry information. For instance, often a light source (e.g., a laser source) is modulated to change various properties of emitted light, such as an amplitude, phase, or frequency of the light to convey information. An optical receiver may receive and demodulate the light waves to recover the information. There are many different types and formats of modulation that can be used, along with a wide range of possible carrier wavelengths. Generally, coherent optical receivers required to provide the ability to accommodate different wavelengths or modulation formats and data rates. For free-space optical communications applications, additional adaptive optics are also required.

SUMMARY OF INVENTION

Aspects and embodiments are directed to optical communications systems and optical receivers including one or more optical cavity resonators, such as a Fabry-Perot etalon, for example. In particular, aspects and embodiments provide methods and apparatus that allow for beam pointing to be maintained while permitting the receiver (without feedback to the transmitter) to tune the optical resonator to suit the wavelength, data rate and modulation format of the incoming optical signal, without requiring a coherent receiver or adaptive optics in addition to the optical resonator(s).

According to one embodiment, an optical receiver comprises an optical resonator assembly including at least one optical resonator configured to receive an input optical signal, to accumulate optical signal energy inside the at least one optical resonator based at least in part on the input optical signal, and to produce an intensity modulated output optical signal, an intensity modulation of the output optical signal being representative of a modulation of the input optical signal, a detector configured to detect the intensity modulated output optical signal and to identify the modulation of the input optical signal based at least in part on the intensity modulation of the output optical signal, and a controller coupled to the detector and to the optical resonator assembly, the controller being configured to provide a first control signal to tune an optical thickness of the at least one optical resonator to optimize an operating point of the at least one optical resonator based on characteristics of the input optical signal.

In one example, the at least one optical cavity resonator is a Fabry-Perot etalon.

In one example, the at least one optical cavity resonator includes a first semi-reflective surface positioned to receive the input optical signal, and a second semi-reflective surface positioned facing the first semi-reflective surface, wherein the at least one optical cavity resonator is configured to accumulate the optical signal energy inside the at least one optical cavity resonator and between the first semi-reflective surface and the second semi-reflective surface to approach a steady-state output value of the output optical signal, the intensity modulation of the output optical signal including a series of deviations from the steady-state output value.

In one example, the at least one optical cavity resonator further includes a material interposed between the first semi-reflective surface and the second semi-reflective surface.

In one example, the material is an electro-optic material, and wherein the controller is configured to apply the first control signal to the electro-optic material to tune the optical thickness of the at least one optical cavity resonator.

In another example, the material is air, and wherein the controller is configured to apply the first control signal to alter a temperature of the air to thereby tune the optical thickness of the at least one optical cavity resonator.

In one example, a first tuning range of the optical thickness of the at least one optical cavity resonator controlled by the first control signal is on the order of a wavelength of the input optical signal.

In one example, the controller is further configured to provide a second control signal to further tune the optical thickness of the at least one optical cavity resonator.

In one example, the characteristics of the input optical signal include a data rate, a carrier wavelength, and a modulation format, and wherein the controller is configured to tune the optical thickness of the at least one optical resonator using the first control signal to optimize the operating point of the at least one optical resonator based on at least one of the modulation format and the carrier wavelength, and wherein the controller is further configured to further tune the optical thickness of the at least one optical resonator using the second control signal to optimize the operating point of the at least one optical resonator based on the data rate.

In one example, the characteristics of the input optical signal include a data rate, a carrier wavelength, and a modulation format, and wherein the controller is configured to tune the optical thickness of the at least one optical resonator using the first control signal to optimize the operating point of the at least one optical resonator based on at least one of the modulation format and the carrier wavelength, and wherein the controller is further configured to further tune the optical thickness of the at least one optical resonator using the second control signal to optimize the operating point of the at least one optical resonator based on rate of change of the phase.

In one example, a second tuning range of the optical thickness of the at least one optical resonator controlled by the second control signal is on the order of a bit length of the modulation of the input optical signal.

In one example, the material is a piezoelectric material, and wherein the controller is configured to apply the first control signal to the piezoelectric material to move the first semi-reflective surface and the second semi-reflective surface to tune at least one optical cavity resonator.

In another example, the material is air, the at least one optical cavity resonator further includes a piezoelectric actuator coupled to at least one of the first and second semi-reflective surfaces, and the controller is configured to apply the first control signal to the at least one piezoelectric actuator to move a corresponding at least one of the first and second semi-reflective surfaces to tune at least one optical cavity resonator.

In one example, the detector includes at least one optical-electrical converter configured to convert the output optical signal into an electrical signal.

In one example, the controller is configured to monitor at least one of the output optical signal and the electrical signal and to provide the first control signal based on a characteristic of the monitored signal.

In one example, the modulation of the input optical signal is phase modulation, frequency modulation, intensity modulation, or a combination thereof.

According to another embodiment, a method of optimizing an operating point of an optical resonator used in an optical receiver comprises receiving an input optical signal at the optical resonator, accumulating optical signal energy within the optical resonator based at least in part on the input optical signal, emitting an intensity-modulated output optical signal from the optical resonator, the intensity modulation of the output optical signal being representative of a modulation of the input optical signal, identifying the modulation of the input optical signal based at least in part on the intensity modulation of the output optical signal, and tuning an optical thickness of the optical resonator to optimize the operating point of the optical resonator based on characteristics of the input optical signal.

In one example, the optical resonator is an etalon having a pair of semi-reflective surfaces configured to at least partially trap the optical signal energy in an electro-optic material disposed between the pair of semi-reflective surfaces by reflecting a portion of optical signal energy between pair of semi-reflective surfaces, and wherein tuning the optical thickness of the optical resonator includes applying a first control signal to the electro-optic material.

In another example, the optical resonator is an etalon having a pair of semi-reflective surfaces separated by air and including a piezoelectric actuator coupled to the pair of semi-reflective surfaces, and wherein tuning the optical thickness of the optical resonator includes applying a first control signal to the piezoelectric actuator to physically move at least one surface of the pair of semi-reflective surfaces.

In one example, the characteristics of the input optical signal include at least one of a carrier wavelength and a modulation format.

In another example, monitoring the intensity of the output optical signal and tuning the optical thickness of the optical resonator are based at least in part on the intensity of the output optical signal.

According to another embodiment an optical receiver comprises an optical resonator assembly including at least one optical resonator configured to receive an input optical signal, to accumulate optical signal energy inside the at least one optical resonator based at least in part on the input optical signal, and to produce an intensity modulated output optical signal, an intensity modulation of the output optical signal being representative of a modulation of the input optical signal, a detector configured to detect the intensity modulated output optical signal and to identify the modulation of the input optical signal based at least in part on the intensity modulation of the output optical signal, and a controller coupled to the detector and to the optical resonator assembly, the controller being configured to provide a first control signal to tune an optical length of the at least one optical resonator to optimize an operating point of the at least one optical resonator based on characteristics of the input optical signal.

In one example, the at least one optical resonator is a Fabry-Perot etalon.

In another example, the at least one optical resonator includes a first semi-reflective surface positioned to receive the input optical signal and a second semi-reflective surface positioned facing the first semi-reflective surface, wherein the at least one optical resonator is configured to accumulate the optical signal energy inside the at least one optical resonator and between the first semi-reflective surface and the second semi-reflective surface to approach a steady-state output value of the output optical signal, the intensity modulation of the output optical signal including a series of deviations from the steady-state output value.

In one example, the at least one optical resonator further includes a material interposed between the first semi-reflective surface and the second semi-reflective surface.

In one example, the material is an electro-optic material and the controller is configured to apply the first control signal to the electro-optic material to tune the optical length of the at least one optical resonator.

In another example, the material is air and the controller is configured to apply the first control signal to alter a temperature of the air to thereby tune the optical length of the at least one optical resonator.

In one example, a first tuning range of the optical length of the at least one optical resonator controlled by the first control signal is on the order of a wavelength of the input optical signal.

In one example, the controller is further configured to provide a second control signal to further tune the optical length of the at least one optical resonator.

In one example, the characteristics of the input optical signal include a data rate, a carrier wavelength, and a modulation format, and wherein the controller is configured to tune the optical length of the at least one optical resonator using the first control signal to optimize the operating point of the at least one optical resonator based on at least one of the modulation format and the carrier wavelength, and wherein the controller is further configured to further tune the optical length of the at least one optical resonator using the second control signal to optimize the operating point of the at least one optical resonator based on the data rate.

In another example, the characteristics of the input optical signal include a data rate, a carrier wavelength, and a modulation format, and wherein the controller is configured to tune the optical length of the at least one optical resonator using the first control signal to optimize the operating point of the at least one optical resonator based on at least one of the modulation format and the carrier wavelength, and wherein the controller is further configured to further tune the optical length of the at least one optical resonator using the second control signal to optimize the operating point of the at least one optical resonator based on rate of change of the phase.

In one example, a second tuning range of the optical length of the at least one optical resonator controlled by the second control signal is on the order of a bit length of the modulation of the input optical signal.

In another example, the material is air and the at least one optical resonator further includes a piezoelectric actuator coupled to at least one of the first and second semi-reflective surfaces, and wherein the controller is configured to apply the first control signal to the at least one piezoelectric actuator to move a corresponding at least one of the first and second semi-reflective surfaces to tune at least one optical resonator.

In one example, the detector includes at least one optical-electrical converter configured to convert the output optical signal into an electrical signal.

In one example, the controller is configured to monitor at least one of the output optical signal and the electrical signal and to provide the first control signal based on a characteristic of the monitored signal.

In one example, the modulation of the input optical signal is phase modulation, frequency modulation, intensity modulation, or a combination thereof.

According to another embodiment a method of optimizing an operating point of an optical resonator used in an optical receiver comprises receiving an input optical signal at the optical resonator, accumulating optical signal energy within the optical resonator based at least in part on the input optical signal, emitting an intensity-modulated output optical signal from the optical resonator, the intensity modulation of the output optical signal being representative of a modulation of the input optical signal, identifying the modulation of the input optical signal based at least in part on the intensity modulation of the output optical signal, and tuning an optical length of the optical resonator to optimize the operating point of the optical resonator based on characteristics of the input optical signal.

In one example, the optical resonator is an etalon having a pair of semi-reflective surfaces configured to at least partially trap the optical signal energy in an electro-optic material disposed between the pair of semi-reflective surfaces by reflecting a portion of optical signal energy between pair of semi-reflective surfaces, and wherein tuning the optical length of the optical resonator includes applying a first control signal to the electro-optic material.

In another example, the optical resonator is an etalon having a pair of semi-reflective surfaces separated by air and including a piezoelectric actuator coupled to the pair of semi-reflective surfaces, and wherein tuning the optical length of the optical resonator includes applying a first control signal to the piezoelectric actuator to physically move at least one surface of the pair of semi-reflective surfaces.

In one example, the characteristics of the input optical signal include at least one of a carrier wavelength and a modulation format.

In one example, the method includes monitoring the intensity of the output optical signal and tuning the optical length of the optical resonator based at least in part on the intensity of the output optical signal.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
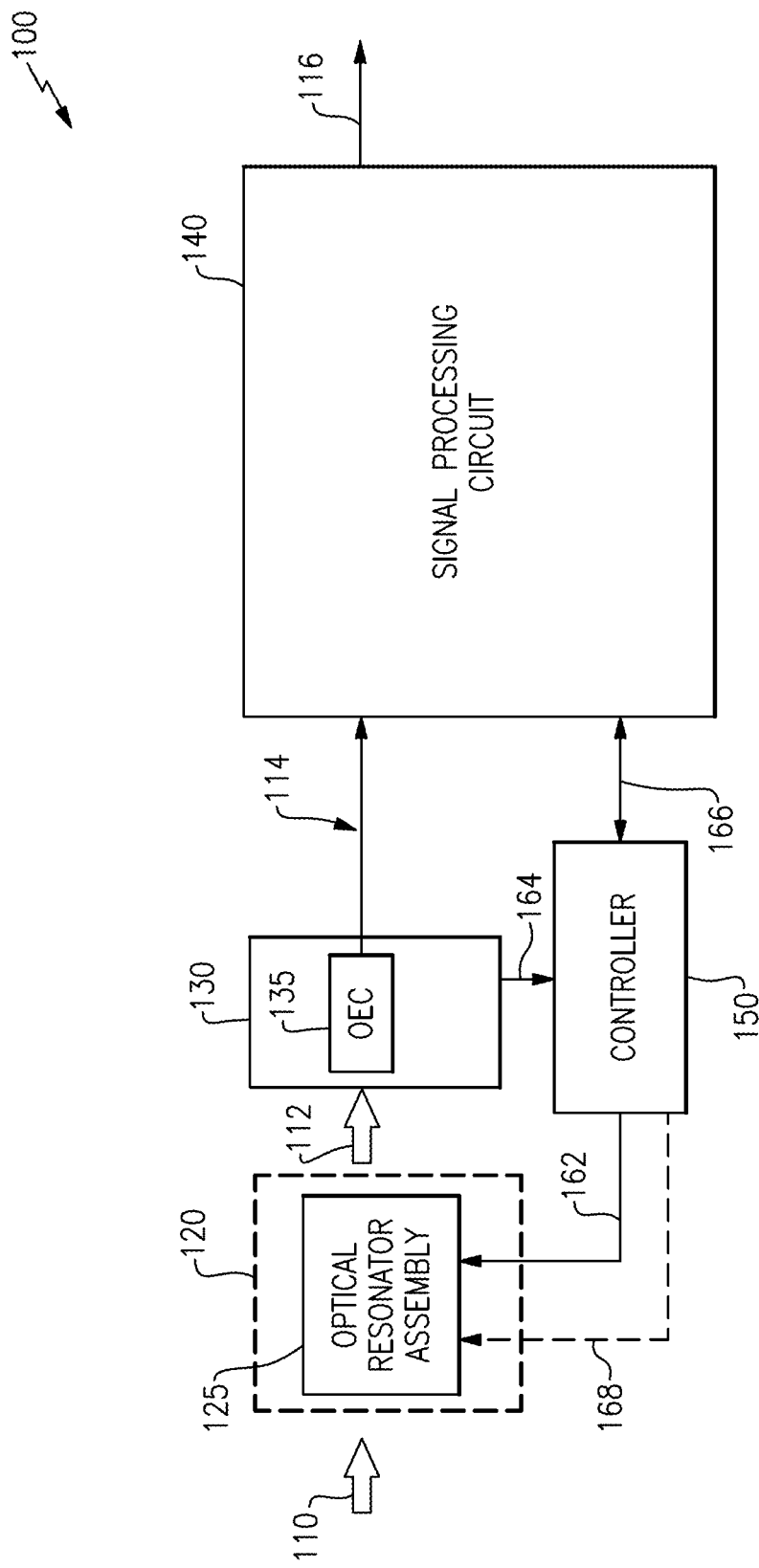
FIG. 1 is a functional block diagram of one example of an optical receiver according to certain aspects of the present invention.

Certain optical signal receivers include an optical resonator assembly, such as a Fabry-Perot resonator assembly or other bulk free-space optical cavity/resonator, that is used to demodulate arriving optical signals. Using an optical resonator assembly in the demodulator may offer advantages over conventional demodulation techniques, including the ability to demodulate coherent optical signals with wavefront distortion without the need for adaptive optics or a coherent receiver. The arriving optical signals may be phase modulated, amplitude modulated, or frequency modulated, or may be modulated using a combination of these techniques (e.g., QAM methods). In certain examples, the optical resonator assembly converts a received a phase, amplitude, or frequency modulated optical signal into a directly detectable intensity modulated output signal, as discussed further below.

The optical resonator assembly may be sensitive to various parameters within the communications system and environment and its output response signal may change as a function of any of these parameters, including the angle of arrival and wavelength of the incoming optical signal, the modulation format, and the data rate. In controlled environments, such as a research laboratory, it may be possible to precisely tune and maintain the optical wavelength and the data rate, thereby allowing the output optical signal to be optimized for a given optical cavity. However, in practical applications, the laser(s) or other optical source used in the transmitter may not be highly tunable, nor may it be as stable, unless significant cost is added to the system. In addition, tuning the laser would require communication across the link between the receiver and the transmitter to provide information to optimize the wavelength for the optical cavity being used in the receiver. This may not be practical or desirable in many applications. Furthermore, regarding the transmission data rate, it is generally desirable to be able to send and receive an optimal signal for different data rates while using the same receiver hardware.

As noted above, the problem of signal optimization can be addressed by changing the carrier wavelength and the data rate. An alternative is to change the cavity dimensions to suit the specific characteristics of the transmitted signal. Cavity tuning is an approach to modify or change the filtering and transient response characteristics of an optical cavity to increase or decrease transmitted intensity. This can be done in any number of ways, including, but not limited to changing the physical cavity length (e.g., by mechanical movement or by the application of pressure), changing the optical density within the cavity (e.g., by using the electrooptic effect or modifying the optical material), or using angle tuning. These approaches have been applied where the optical cavity resonator receives a continuous-wave (CW) or quasi-CW signal, but not where the received optical signals are modulated. While angle tuning can be an effective method to modify and optimize the cavity operating point and thereby provide signal optimization, there are many applications where angle tuning is not optimal. In particular, in the case where there is wavefront distortion, it is desirable to maintain a normal angle of incidence of the input optical signal at the optical resonator.

Aspects and embodiments provide methods and apparatus for allowing an optical receiver to be optimized dynamically for varying conditions (e.g., changing carrier wavelength, modulation format, and/or data rate) without requiring communication between the transmitter and receiver and without requiring a high-performance transmitter. As discussed in more detail below, according to certain aspects, the operating point of an optical cavity resonator be changed by modifying the optical path length, and by changing the path length, the transmission characteristics in both CW transmission and modulation response can be tailored. Thus, by changing the optical path length, the optical cavity resonator's response can be tuned to effectively convert the incoming waveform into a modulated intensity that can be used to recover the information being transmitted. This tuning can be applied to adjust the optical cavity resonator to changing characteristics of the transmitted waveform (arriving optical signal), and also to tune the change in transmitted energy from the optical cavity resonator (the transmission characteristic) as a function of the magnitude, direction, and/or rate of the modulation change in the arriving optical signal.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

FIG. 1 is a block diagram of one example of an optical receiver according to certain embodiments. The optical receiver 100 receives a modulated optical signal 110 transmitted along a free space signal path (e.g., free space optical, FSO), a fiber coupling, or another waveguide system from a transmitter (not shown). The optical receiver 100 includes a demodulator 120 that includes an optical resonator assembly 125. The optical receiver 100 further includes a detector assembly 130 including at least one optical-electrical converter (OEC) 135, and a signal processing circuit 140. In certain examples, the detector assembly 130 and the signal processing circuit 140 may be collectively referred to as a detector. The detector assembly 130 and the signal processing circuit 140 may be separate components or may be part of a common module. The optical resonator assembly 125 is positioned to receive the modulated optical signal 110 and to produce an output optical signal 112 that has characteristics representative of the modulation of the modulated optical signal 110, as discussed further below. The detector assembly 130 receives the output optical signal 112 from the optical resonator assembly 125 and the at least one OEC 135 converts the optical signal 112 into an electrical signal 114 that can be processed by the signal processing circuit 140 to produce a decoded information signal 116. The decoded information signal 116 may include the information that was encoded on the modulated optical signal 110 by the modulation of the modulated optical signal 110. The OEC 135 may include one or more photo-diodes, for example, or other components capable of transforming an optical signal into an electrical signal. The signal processing circuit 140 may include various components, as will be understood by those skilled in the art, such as analog-to-digital converters, filters, amplifiers, controllers, etc., to condition and process the electrical signals received from the detector assembly 130 to produce the decoded information signal 116. The optical receiver 100 may further include a controller 150 that may be coupled to the optical resonator assembly 125 and configured to adjust parameters of the optical resonator assembly 125 to maintain a particular operating point of one or more optical resonators included in the optical resonator assembly 125, as discussed in more detail below.

In certain examples, the optical resonator assembly 125 includes one or more optical resonators configured to convert the modulation of the modulated optical signal 110 into intensity modulation of the output optical signal 112. As noted above, the modulated optical signal 110 may be phase modulated, amplitude modulated, and/or frequency modulated. As used herein, the term "optical resonator" refers to a component capable of sensing variations, such as frequency variations, amplitude variations, or phase variations in the received optical signal 110. Examples of optical resonators may include Fabry-Perot etalons or other types of optical resonators. Each optical resonator in the optical resonator assembly 125 converts the modulation of the arriving/input optical signal 110 in part by interaction of the arriving optical signal 110 with optical energy built-up in the resonator.

Operation of an optical resonator as a phase change detector is discussed below using the example of an etalon; however, those skilled in the art will appreciate that other types of optical resonators can be operated according to similar principles. Further, the optical resonator may respond similarly to amplitude modulated or frequency modulated input optical signals.

Figure 2:
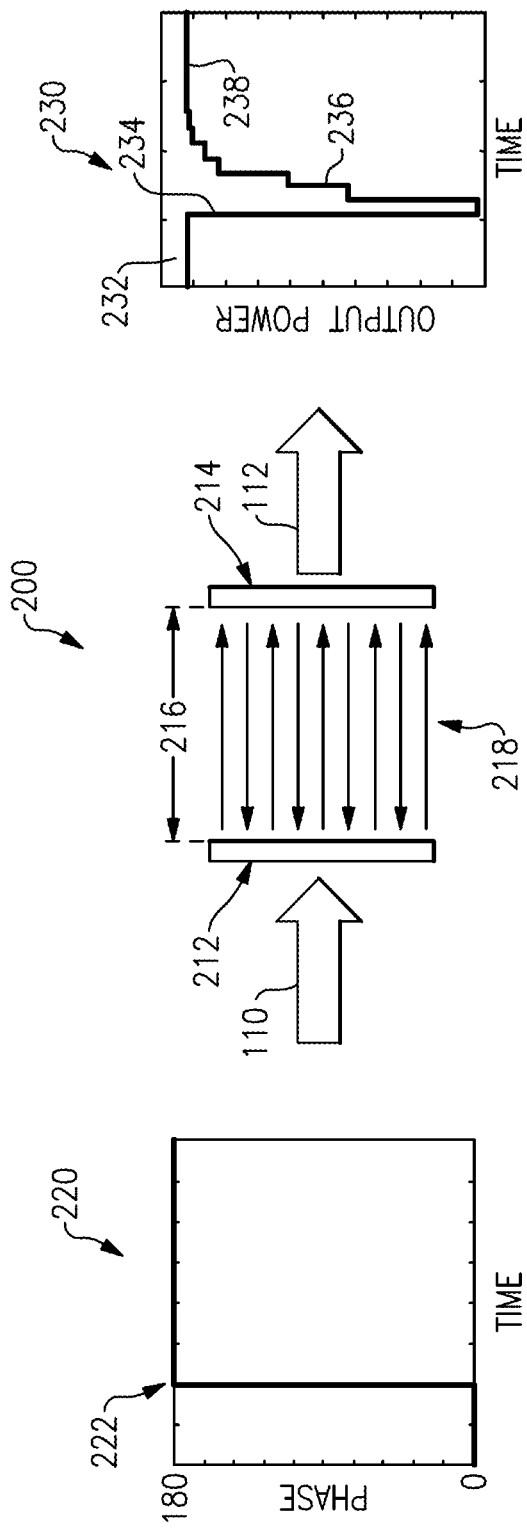
FIG. 2 is a diagram illustrating an example of operation of an etalon according to aspects of the present invention.

Referring to FIG. 2, in certain examples an etalon 200 is a component having a pair of parallel semi-reflective surfaces 212, 214 that may include an optically transparent material in between, and has a characteristic resonant frequency associated with a certain wavelength of light based upon the spacing (i.e., dimension 216) between the semi-reflective surfaces. The surfaces 212, 214 are semi-reflective and also semi-transmissive, in that they allow some light through, and therefore the arriving modulated optical signal 110 may be allowed into the etalon 200 and may resonate or accumulate inside the etalon (i.e., in the interior 218 between the two semi-reflective surfaces 212, 214). Additionally, some of the light resonating inside is allowed out of the etalon 200 (through at least one of the semi-transmissive surfaces). Light emerging from the etalon 200 is shown, for example, as the output optical signal 112.

The optical signal 110 received by the etalon 200 establishes a steady-state condition in which optical signal energy continuously arrives at the etalon 200, adds to the built-up, optically resonating, energy existing inside the etalon 200, and emerges from the etalon 200 at a constant rate. If the frequency, amplitude, or phase of the input optical signal 110 changes, this change causes a temporary disruption to the resonance inside the etalon 200 and the light intensity emerging from the etalon 200 is also disrupted, until a steady state condition is re-established. Accordingly, a change in phase, frequency, or amplitude of the arriving optical signal 110 causes a change in intensity of the output optical signal 112. Thus, the etalon functions as a demodulator, or a modulation converter, for the optical signal 110. The output optical signal 112 may therefore carry the same information content as the arriving optical signal 110, but in an intensity modulated form, rather than a phase modulated form, for example.

FIG. 2 illustrates an example of the above-described operation of the etalon 200. FIG. 2 shows a graph 220 of the input modulated optical signal 110, showing a phase change in the optical signal 110. The graph 220 plots the phase (vertical axis) of the optical signal 110 over time (horizontal axis), showing a phase transition of pi (180 degrees) at point 222. FIG. 2 also shows a graph 230 of optical signal intensity (as output power) emerging from the etalon 200 during the phase transition in the received optical signal 110. At region 232 the etalon 200 is in a steady-state resonance condition wherein a steady intensity of light emerges. At point 234, corresponding to point 222 in the graph 220, a phase transition occurs in the arriving optical signal 110, temporarily disrupting the steady-state and causing a drop in the emerging light intensity. During successive reflections inside the etalon 200, and indicated region 236 in the graph 230, resonance is re-establishing, and the emerging light intensity increases until, at point 238, a steady intensity of light emerges when the etalon 200 has returned to a steady-state condition. Thus, variations in the intensity of the output optical signal 112 from the etalon 200 indicate that a transition occurred in the arriving optical signal 110, such as a phase transition due to phase modulation of the optical signal 110.

The etalon 200 may have varying levels of reflectivity of the semi-reflective surfaces 212, 214. In certain examples, the reflectivity may be expressed as a fraction of light amplitude reflected back into the interior 216 or may be expressed as a fraction of light intensity reflected back into the interior 216. The reflectivity of each of the first and second semi-reflective surfaces 212, 214 may be the same or different, and may be any suitable value for a particular implementation. The etalon 200 is one example of a suitable optical resonator in accord with aspects and embodiments described herein. However, the use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like. In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples. In the example shown in FIG. 2, the output intensity/power from the etalon 200 exhibits a transient disturbance that is a temporary reduction in power; however, in other configurations the transient disturbance may instead be a temporary increase in response to a phase (or amplitude or frequency) transition occurring in the arriving modulated optical signal 110.

The optical resonator assembly 125 may include one or more etalons 200, or other types of optical resonators that operate similarly to convert the modulation of the input optical signal 110 into the intensity-modulated output optical signal 112 which may then be detected and processed to recover the information encoded in the original optical signal 110. As discussed above, in various examples, each optical resonator within the optical resonator assembly 125 may have one or more characteristic resonant frequencies (alternatively referred to as a characteristic resonant wavelength). When the frequency of the input optical signal 110 corresponds to the characteristic resonant frequency of the optical resonator, optical signal energy accumulates to build-up resonating optical signal energy inside that optical resonator, as discussed above, and the optical resonator is said to be operating in a resonant mode or condition. An optical resonator that is operating in a resonant mode may also be referred to as being "tuned" to the input optical signal 110. An optical resonator that is tuned to the frequency of the received optical signal 110 may output optical signal energy 112 of a higher intensity (e.g., amplitude) relative to one that is detuned. However, an optical resonator that is slightly detuned may provide a different response to a given modulation transition in the input optical signal 110 than an optical resonator that is tuned or one that is detuned by a different amount. Certain responses may be more desirable in some circumstances than other responses, and therefore it may be desirable to be able to tune the optical resonator to a particular resonance condition (i.e., on resonance or off-resonance/detuned by a certain amount).

Figure 3A:
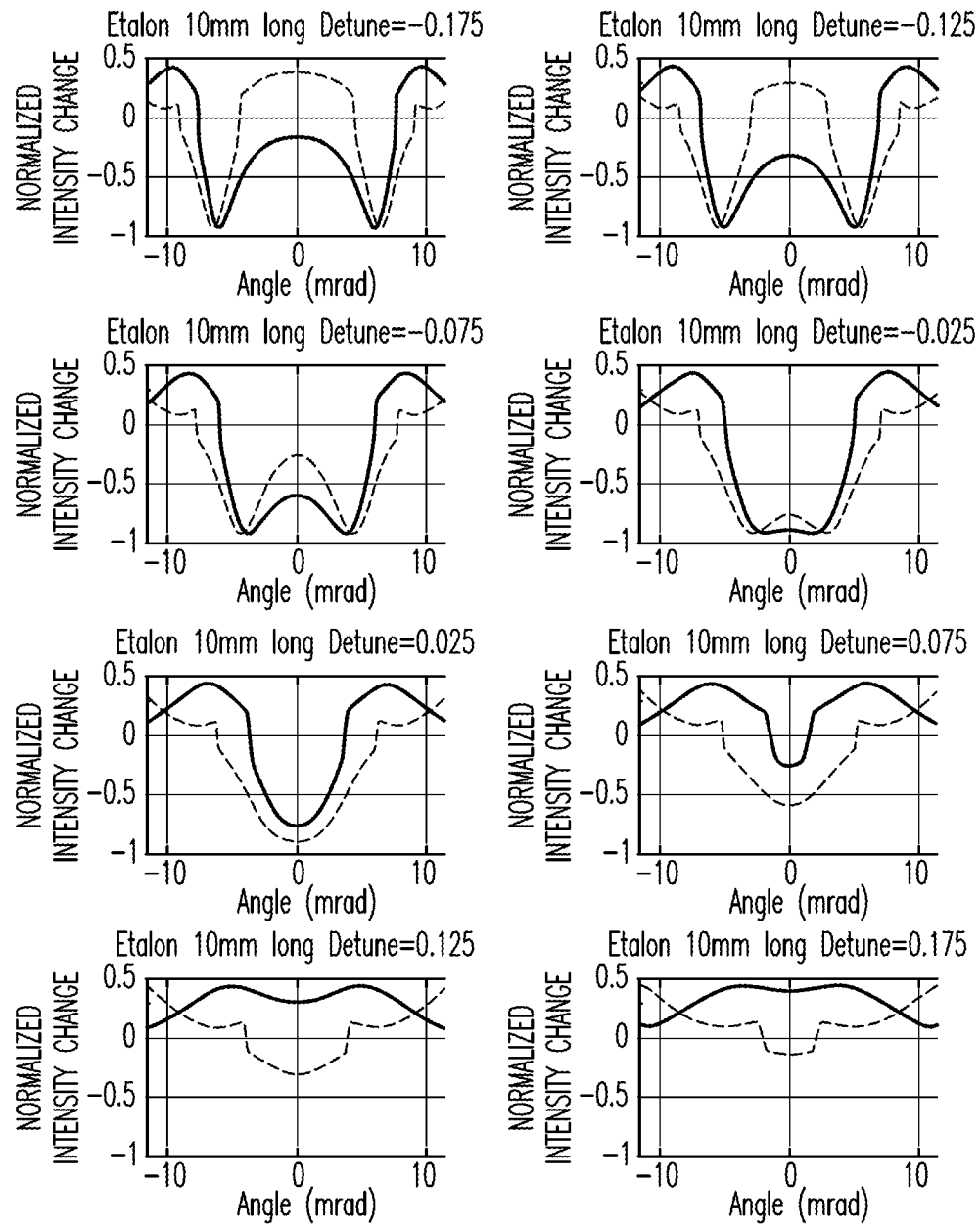
FIG. 3 is a series of graphs showing transmission characteristics for examples of optical cavity resonators with different operating points, according to aspects of the present invention.
Figure 3B:
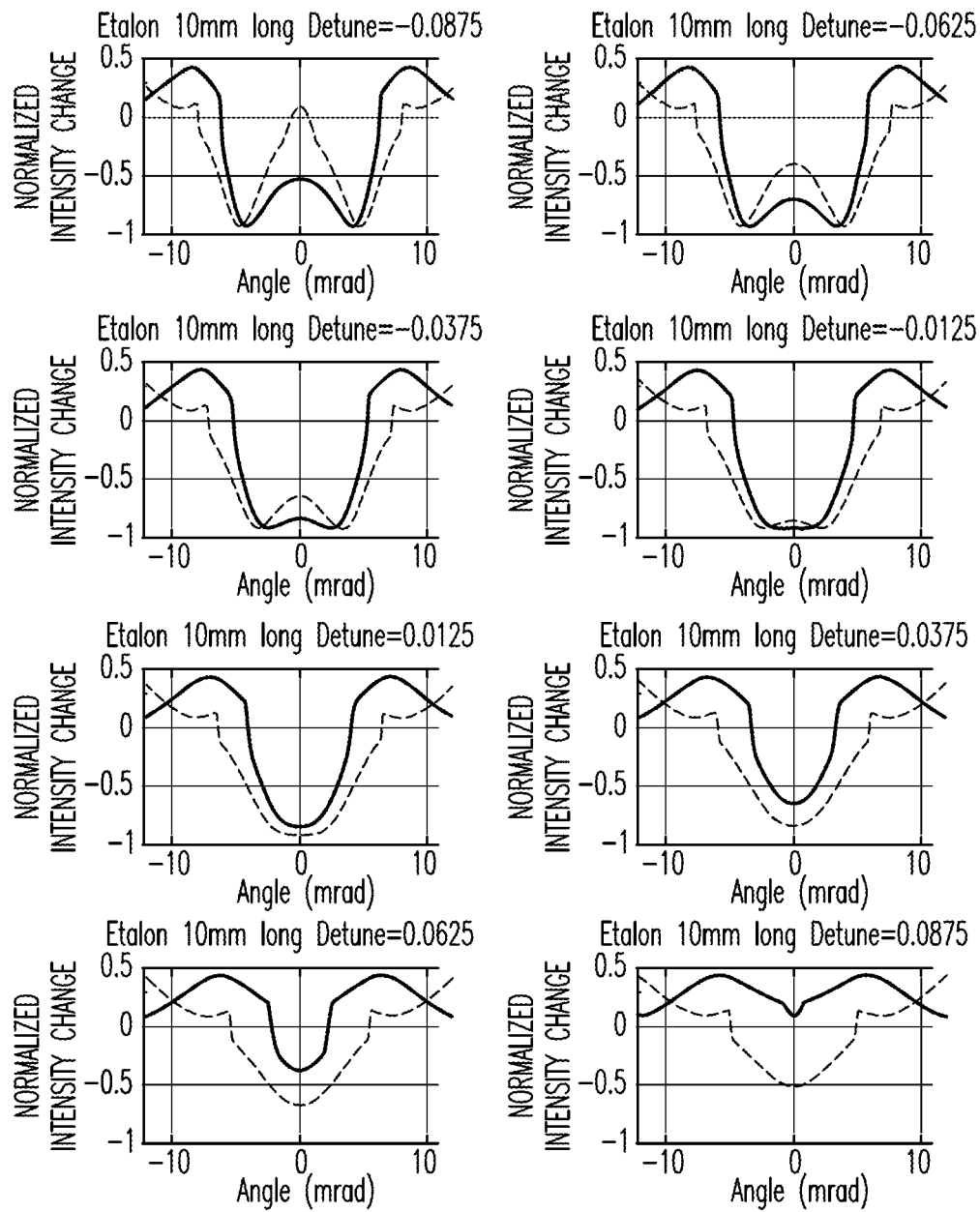

FIG. 3 illustrates a series of graphs showing intensity changes normalized to the incident intensity level in an example of the output optical signal 112 (the transmission characteristics of the etalon 200) in response to positive and negative phase shifts in the input optical signal 110 for examples of the etalon 200 having different amounts of detuning. In each case, the phase shifts are of the same magnitude (Pi). In each graph, the solid line curve represents the intensity change for a positive phase shift (+Pi) and the dashed line curve represents the intensity change for a negative phase shift (−Pi). As shown, the intensity profile, or transmission characteristics, may vary significantly for the same phase shift based on the operating point (amount of detuning) of the etalon 200. Accordingly, by precisely controlling the operating point of the etalon 200, a desired response to a certain phase shift (magnitude and direction) can be achieved. For example, in certain applications it may be desirable to able to reliably distinguish between positive and negative phase shifts of the same magnitude. Accordingly, for such applications, it may be preferable to tune the etalon 200 to an operating point where there is a significant difference in the transmission characteristics in response to positive phase shifts versus negative phase shifts.

The resonance condition, or operating point, of the optical cavity resonator depends on the wavelength, $\lambda$, of the input optical signal 110 and the optical path length of the optical resonator. The optical path length is also dependent on the angle of incidence of the input optical signal 110 because that angle determines the angle at which the optical signal 110 travels between the first and second semi-reflective surfaces 212, 214. For a given wavelength, the optical path length of the etalon 200 is shortest for normal incidence and increases as the angle of incidence of the optical signal 110 changes away from normal. In certain applications, such as in free-space optical communications where there may be significant turbulence or where the input optical signal 110 may have low spatial coherence, it is desirable to maintain the angle of incidence of the input optical signal 110 at normal, or as close to normal as possible. However, as noted above, it may still be desirable to tune the etalon 200 to a particular operating point. According to certain embodiments, this may be achieved by controlling the optical thickness of the etalon 200 (i.e., the optical path length through the etalon 200).

Figure 4:
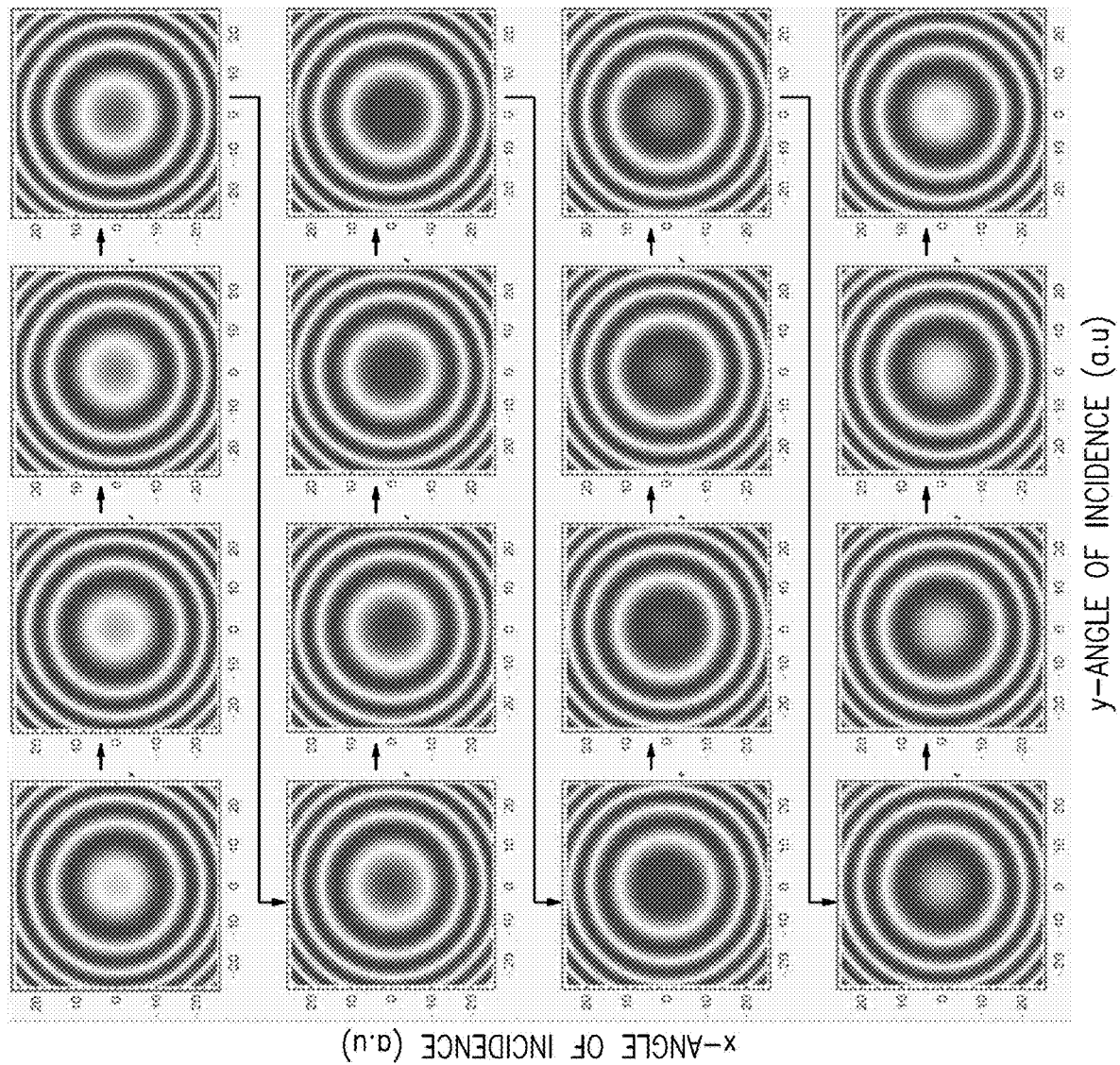
FIG. 4 is a series of diagrams illustrating an example of the changing interference pattern at an optical resonator as the optical path length of the resonator changes, in accord with aspects of the present invention.

FIG. 4 is a diagram showing a series of steady-state interference patterns formed at an example of the etalon 200 in response to receiving an example of the input optical signal 110, corresponding to the optical transmission characteristics of the etalon. The input optical signal 110 constructively or destructively interferes with itself and with the optical energy accumulated within the etalon 200 based on the resonant conditions of the etalon 200. The pattern is plotted in angular space, such that each point on the two-dimensional plot corresponds to an angle of arrival of the optical signal 110 along the x and y axes. For any given angle of arrival, that point on the plot provides the amount of light, ranging from 1 to a minimum value (which may be near zero or some other minimum value). Light and dark regions in the interference pattern 240 indicate constructive interference (peaks) and destructive interference (valleys) fringes, respectively. In this example, the fringes are symmetric and form a circular pattern. For a given wavelength and optical path length, the pattern is static. However, the etalon 200 has a resonance structure that is periodic based on the optical path length. According to certain embodiments, by changing the optical path length of the etalon 200, any resonant condition can be achieved at any incident angle of the optical signal 110. FIG. 4 shows the progression of fringes, as a function of x and y incident angle, that result as the optical thickness (optical path length) of an example of the etalon 200 is changed. The location of maximum (or minimum) resonance transitions from one angular position of the input optical signal 110 to the next, eventually returning in appearance to the initial fringe pattern. As shown, as the optical path length, and thus the operating point of the etalon 200 (since as discussed above, the operating point is dependent on the optical path length), changes, the amount of transmitted light also changes between 100% transmission and some lower value, depending on reflectivities of the semi-reflective surfaces 212, 214.

According to certain embodiments, a method is applied by which a given resonant condition of one or more optical cavity resonators (e.g., embodiments of the etalon 200) can be selected and/or maintained by dynamically tuning the optical path length of the cavity. In one embodiment, this may be accomplished by controlling the physical thickness (e.g., dimension 216) of the etalon 200, which in turn adjusts the optical path length. For example, as discussed above, the etalon 200 may include the two semi-reflective surfaces 212, 214, which are spaced apart from one another to form the cavity, which may be air-filled in certain examples. In such case, piezoelectric actuators may be coupled to the two semi-reflective surfaces 212, 214 and configured to move one or both surfaces to alter the spacing between them and therefore alter the dimension 216. In other examples, changing the optical path length of the cavity can be accomplished by maintaining the physical thickness but changing material properties (e.g., index of refraction) of the etalon 200 that adjust the optical path length. In some embodiments, a combination of both tuning methods can be applied to provide tuning of different scale (e.g., fine tuning on the order of fractions of one wavelength and course tuning on the order of many wavelengths), as discussed further below. In certain examples, course tuning can be performed using piezoelectric actuators, as discussed above, and fine tuning can be accomplished using temperature. In other examples, course and fine tuning can be performed using the piezoelectric actuators. In this manner, the etalon 200 can be tuned to achieve or maintain a particular operating point to achieve desired transmission characteristics as parameters such as the carrier wavelength, modulation format, or data rate of the input optical signal 110 change. In this matter, the output optical signal 112 can be dynamically optimized for any particular carrier wavelength, modulation format, and/or data rate, while using the same optical receiver 100. It is appreciated that tuning the optical path length (optical cavity length) of an optical resonator is not limited to, for example, piezoelectric tuning, electrooptic tuning, or temperature tuning of the optical path length of an air-filled optical resonator. According to aspects and embodiments, either or both of fine or coarse tuning can be done by, for example, temperature tuning of a solid material, such as silicon, fused silica, and the like. In general, either or both of fine or coarse tuning can be done with, for example, pressure tuning of solids, liquids and gases, as well as mechanical movement of a stage or actuator. It is appreciated that any such tuning of an optical path length of a cavity or resonator, by whatever mechanism, may be used.

For certain variations in the input optical signal 100, such as the carrier wavelength or the type of modulation of the input optical signal 110 (e.g., BPSK, QAM, QPSK, etc.), the output optical signal 112 can be optimized by tuning the optical path length of the etalon 200 over a very small range. The response or transmission characteristics of the etalon 200 as influenced or determined by the optical path length of the cavity are sensitive to these characteristics of the input optical signal 110 on the order or scale of the optical wavelength. This is illustrated in FIG. 3, for example. As shown in FIG. 3, fine or "microscale" tuning of the optical path length of the etalon 200 can cause a significant difference in the intensity profile of the output optical signal 112. Thus, in certain embodiments, this microscale tuning of the optical path length of the etalon 200 can be used to control or optimize the output optical signal 112 for a particular modulation format and/or carrier wavelength of the input optical signal 110. In addition, this microscale tuning can be used to adjust the response of the etalon 200 to correct for variations in the angle of incidence of the input optical signal 110, as may be caused by turbulence in the free-space optical path or shifts in the orientation of the optical receiver 100 or transmitting source of the optical signal 110, for example. As discussed above, in certain examples, microscale tuning can be performed using piezoelectric actuators and/or temperature-controlled tuning.

Referring again to FIG. 1, this tuning can be accomplished under the control of the controller 150. For example, the controller 150 may apply a first control signal 162 to the optical resonator assembly 125 to tune the optical path length of one or more optical cavity resonators included in the optical resonator assembly. Because the scale of tuning to optimize the operating point of the optical resonator(s) for various modulation formats or carrier wavelengths, for example, of the input optical signal 110 is small (e.g., on the order of the optical wavelength, as discussed above), in certain examples this tuning may be accomplished using the electro-optic effect. In certain examples, a dynamically adjustable material, such as an electro-optic material, for example, can be used in the interior 218 of the etalon 200 to allow for dynamic adjustment of the optical path length of the cavity. For example, where the material in the interior 218 of the etalon 200 is an electrooptic material, the controller 150 may provide the first control signal 162 to apply a voltage to the electrooptic material to alter the index of refraction of the material, causing the optical thickness of the etalon 200 to change between semi-reflective plates 212, 214. Similar operation may be achieved using another electrically actuatable material, such as a piezoelectric material, for example, or using temperature.

In certain examples, the controller 150 and/or the signal processing circuit 140 may monitor the amplitude (or another characteristic) of the output optical signal 112, for example, by monitoring the electrical signal 114 output from the detector assembly 130, as indicated at 164, to determine the operating point of the optical resonator assembly 125. The first control signal 162 may be produced, for example, based on information obtained from the electrical signal 114, optionally in combination with information obtained from the signal processing circuit 140 (indicated at 166). In certain examples, a sample of the input optical signal 110 may be used in combination with information about the output optical signal 112 (e.g., its intensity) to produce the first control signal 162. Thus, the controller 150 may responsively provide the first control signal 162 to tune one or more of the optical resonators in the optical resonator assembly 125 to optimize the operating point.

In addition, the tuning speed can be very fast, allowing for rapid, dynamic adjustment in response to changing characteristics of the input optical signal 110 or small variations in the angle of incidence of the input optical signal 110, for example, due to turbulence. Thus, the optical resonator(s) can be tuned to maintain any desired operating point and, in addition, the operating point may be easily and quickly changed from signal to signal, for example, to optimize the output optical signal 112 over a wide range of changing conditions.

As discussed above, in certain embodiments, the optical resonator(s) in the optical resonator assembly can also be tuned to optimize the output optical signal 112 for different data rates in the modulation of the input optical signal 110. FIGS. 5A-D and 6A-D illustrate the impact that the optical path length of the etalon 200 may have on the overall efficiency for a given data rate. FIGS. 5A-D are graphs showing examples of phase-modulated input optical signals 110. FIGS. 6A-C are graphs showing the corresponding output optical signal 112 for the input conditions of FIG. 5A-C, respectively.

Figure 5A:
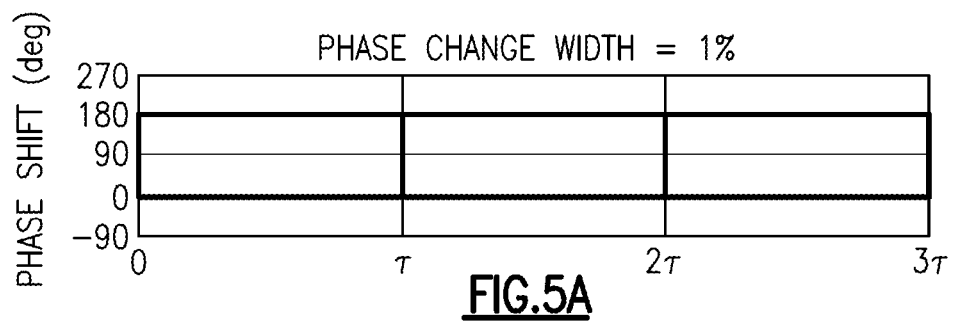
FIGS. 5A-5C are graphs showing examples of modulated input optical signals, according to certain aspects of the present invention.
Figure 5B:
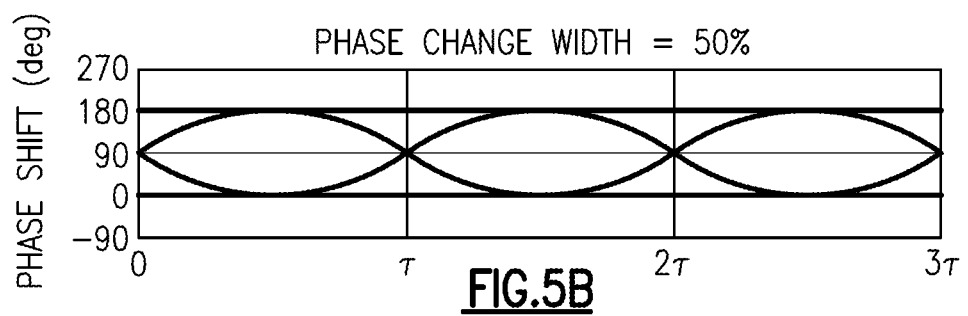
Figure 6A:
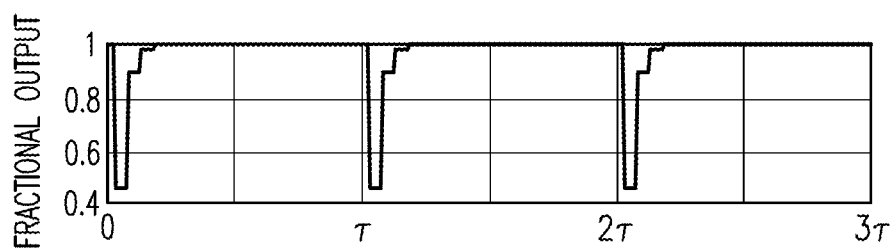
FIGS. 6A-6C are graphs showing intensity profiles of corresponding output optical signals from an optical cavity resonator, according to aspects of the present invention.
Figure 6B:
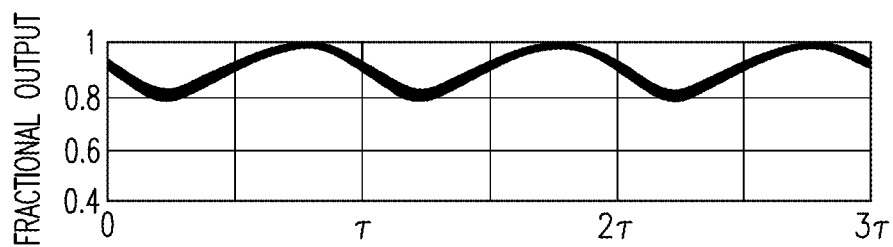
Figure 6C:
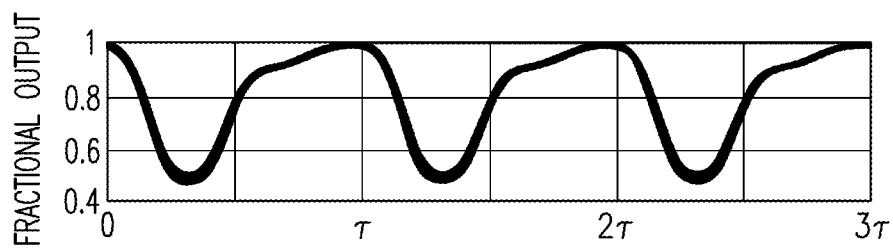

For the example corresponding to FIGS. 5A and 6A, the etalon 200 has an optical path length of 0.8 in arbitrary units (a.u.), dimension 216, and the width of the phase transition in the input optical signal 110 is 1% of the bit window. This example illustrates a thin etalon 200 tuned to a fast response for a fast bit transition in the input optical signal 110. The intensity change in the output is large in magnitude, but short in duration. Alternatively, for the example corresponding to FIGS. 5B and 6B, the front width is 50% of the bit window (slow phase transition), and the etalon has an optical thickness of 3.1 a.u. Here, the intensity change is small in magnitude, but long in duration. In each case, as may be seen with reference to FIGS. 6A and 6B, the amount of integrated intensity change is small, which may not be optimal.

Figure 5C:
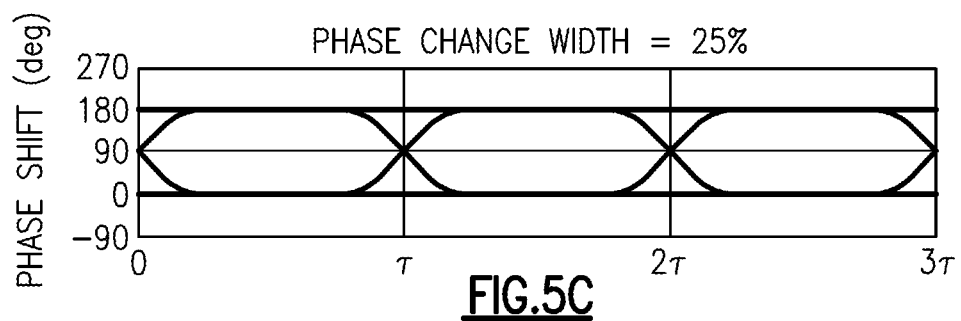

FIGS. 5C and 6C illustrate a further example. In the case of FIGS. 5C and 6C, the front width of the phase transition in the input optical signal is 25% of the bit window (approximately mid-way between FIGS. 5A and 5B), and the etalon has an optical thickness of 4.6 mm. In this case, the rate of the phase change and the length of the etalon are well matched to produce a large intensity change over a long duration. Thus, this example illustrates a case where the operating point of the etalon 200 is optimized.

It has been observed that the phase width is typically 15-25% of the bit window for the transmit signal. This keeps the electronics needed for a given data rate reasonable, while still giving a large enough change to be detected. This is independent of the etalon, which can also be optimized.

FIGS. 5A-C and 6A-C demonstrate that the optical thickness (optical path length) of the etalon 200 is sensitive to the rate of the phase (determined by the data rate) of the modulation of the input optical signal 110, and that if the etalon 200 is not well tuned to the data rate, the output optical signal efficiency can be severely degraded, which may negatively impact the ability to reliably and accurately recover the modulation information in the input optical signal 110. Accordingly, aspects and embodiments provide for tuning of the optical path length of the etalon 200 to adjust to any given data rate of the input optical signal 110 and optimize the corresponding output optical signal 112.

Cavity length tuning for signal optimization as a function of data rate is a coarse adjustment, sensitive on the scale of the bit length, whereas other characteristics, such as carrier wavelength or modulation format, are sensitive on the scale of the optical wavelength, as discussed above. In addition, the data rate of the input optical signal 110 may not vary rapidly or frequently, and therefore it may not be necessary to make these coarse or large-scale adjustments to the optical path length of the etalon 200 as frequently as the microscale tuning discussed above may be performed. Accordingly, referring again to FIG. 1, in certain embodiments, the controller 150 may be configured to provide a second control signal 168 to the optical resonator assembly 125 for coarse ("macroscale") tuning of one or more optical resonators. The method by which the macroscale tuning is accomplished may be the same or different as the method by which the microscale tuning is achieved. For example, as discussed above, microscale tuning may be done (responsive to the first control signal 162) using the electro-optic effect, which in some examples may also be effective for macroscale tuning, but in other examples may not provide sufficient tuning range for macroscale tuning. In certain example, the macroscale tuning may be achieved by physically altering the interior dimension 216 of the etalon 200, for example, through piezoelectric tuning or using a mechanical device, such as a tuning screw or other mechanism. As noted above, in certain examples, the controller 150 may control the macroscale tuning through the second control signal 168. For example, in certain configurations, the output optical signal 112 (or corresponding electrical signal 114) may be monitored and used to tune the optical pathlength, while in other examples, a separate sample of the input optical signal 110 may be used in conjunction with the information about the intensity of the output optical signal 112 to optimize the operating point of the etalon(s) 200, as discussed above. In certain examples, for example, where a mechanical tuning screw is used for macroscale tuning of the etalon, the adjustments may be performed by a system operator and may not be automatically controlled by the controller 150.

Thus, aspects and embodiments provide an optical receiver, and methods of configuring the optical receiver, in which the operating point of one or more optical cavity resonators used for modulation conversion in the optical receiver can be tuned to optimize the receiver performance for many varying conditions, including changing modulation type, data rate, carrier wavelength, and angle of arrival of the received input optical signals, to provide a highly robust and flexible receiver.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical receiver comprising:
an optical resonator assembly including at least one optical resonator configured to receive an input optical signal, to accumulate optical signal energy inside the at least one optical resonator based at least in part on the input optical signal, and to produce an intensity modulated output optical signal, an intensity modulation of the output optical signal being representative of a modulation of the input optical signal;
a detector configured to detect the intensity modulated output optical signal and to identify the modulation of the input optical signal based at least in part on the intensity modulation of the output optical signal; and
a controller coupled to the detector and to the optical resonator assembly, the controller being configured to provide a first control signal to tune an optical length of the at least one optical resonator to optimize an operating point of the at least one optical resonator based on characteristics of the input optical signal, wherein the at least one optical resonator is an etalon that includes:
a first semi-reflective surface positioned to receive the input optical signal; and
a second semi-reflective surface positioned facing the first semi-reflective surface,
wherein the at least one optical resonator is configured to accumulate the optical signal energy inside the at least one optical resonator and between the first semi-reflective surface and the second semi-reflective surface to approach a steady-state output value of the output optical signal,
wherein the at least one optical resonator further includes a material interposed between the first semi-reflective surface and the second semi-reflective surface, and
wherein the controller is configured to apply the first control signal to alter one or more properties of the material to thereby change the optical length of the at least one optical resonator.

2. The optical receiver of claim 1, wherein the at least one optical resonator is a Fabry-Perot etalon.

3. The optical receiver of claim 1, wherein the material is an electro-optic material, and wherein the controller is configured to apply the first control signal to tune the optical length of the at least one optical resonator by altering an index of refraction of the at least one optical resonator.

4. The optical receiver of claim 1, wherein the material is air, and wherein the controller is configured to apply the first control signal to alter a temperature of the air to thereby tune the optical length of the at least one optical resonator.

5. The optical receiver of claim 1, wherein a first tuning range of the optical length of the at least one optical resonator controlled by the first control signal is on the order of a wavelength of the input optical signal.

6. The optical receiver of claim 1, wherein the controller is further configured to provide a second control signal to further tune the optical length of the at least one optical resonator, the optical receiver further comprises a piezoelectric actuator coupled to the first semi-reflective surface and the second semi-reflective surface, and wherein tuning the optical length of the at least optical resonator includes applying the second control signal to the piezoelectric actuator to physically move at least one surface of the first semi-reflective surface and the second semi-reflective surface.

7. The optical receiver of claim 6, wherein the characteristics of the input optical signal include any of a carrier wavelength and a modulation format, and wherein the controller is configured to tune the optical length of the at least one optical resonator using the first control signal to optimize the operating point of the at least one optical resonator based on at least one of the modulation format and the carrier wavelength.

8. The optical receiver of claim 6, wherein the characteristics of the input optical signal include a data rate and wherein the controller is further configured to further tune the optical length of the at least one optical resonator using a second control signal to optimize the operating point of the at least one optical resonator based on the data rate or based on a rate of change of a phase of the input optical signal.

9. The optical receiver of claim 7, wherein a second tuning range of the optical length of the at least one optical resonator controlled by the second control signal is on the order of a bit length of the modulation of the input optical signal.

10. The optical receiver of claim 1, wherein the material is air, wherein the at least one optical resonator further includes a piezoelectric actuator coupled to at least one of the first and second semi-reflective surfaces, and wherein the controller is configured to apply the first control signal to the at least one piezoelectric actuator to move a corresponding at least one of the first and second semi-reflective surfaces to tune at least one optical resonator.

11. The optical receiver of claim 1, wherein the detector includes at least one optical-electrical converter configured to convert the output optical signal into an electrical signal.

12. The optical receiver of claim 11, wherein the controller is configured to monitor at least one of the output optical signal and the electrical signal and to provide the first control signal based on a characteristic of the monitored signal.

13. The optical receiver of claim 1, wherein the modulation of the input optical signal is phase modulation, frequency modulation, intensity modulation, or a combination thereof.

14. The optical receiver of claim 1, wherein applying the first control signal to alter one or more properties of the material to change the optical path length of the at least one optical resonator further comprises:
the one or more properties including a temperature of the material, and the optical path length is changed by altering the temperature of the material; or
the one or more properties including an index of refraction of the material, the material is an electro-optic material, and the optical path length is changed by altering the index of refraction of the electro-optic material.

15. The method of claim 1, wherein the first semi-reflective surface and the second semi-reflective surface are configured to at least partially trap the optical signal energy in the material interposed between the first semi-reflective surface and the second semi-reflective surface by reflecting a portion of optical signal energy between the first semi-reflective surface and the second semi-reflective surface.

16. A method of optimizing an operating point of an etalon used in an optical receiver, the method comprising:
receiving an input optical signal at the etalon;
accumulating optical signal energy within the etalon based at least in part on the input optical signal;
emitting an intensity-modulated output optical signal from the etalon, the intensity modulation of the output optical signal being representative of a modulation of the input optical signal;
identifying the modulation of the input optical signal based at least in part on the intensity modulation of the output optical signal; and
providing a first control signal to tune an optical length of the etalon to optimize the operating point of the etalon based on characteristics of the input optical signal, wherein the etalon includes a pair of semi-reflective surfaces, and wherein tuning the optical length of the etalon includes applying the first control signal to alter one or more properties of a material interposed between the pair of semi-reflective surfaces to change the optical length of the etalon.

17. The method of claim 16, wherein a piezoelectric actuator is coupled to the pair of semi-reflective surfaces, and wherein tuning the optical length of the etalon includes applying the first control signal to the piezoelectric actuator to physically move at least one surface of the pair of semi-reflective surfaces.

18. The method of claim 16, wherein the characteristics of the input optical signal include at least one of a carrier wavelength and a modulation format.

19. The method of claim 16, further comprising:
monitoring the intensity of the output optical signal and tuning the optical length of the optical resonator based at least in part on the intensity of the output optical signal.

20. The method of claim 16, wherein the optical receiver further comprises a piezoelectric actuator coupled to the first semi-reflective surface and the second semi-reflective surface, and wherein tuning the optical length of the at least optical resonator includes applying the second control signal to the piezoelectric actuator to physically move at least one surface of the first semi-reflective surface and the second semi-reflective surface.

21. The method of claim 16, wherein applying the first control signal to alter one or more properties of the material to change the optical path length of the etalon further comprises:
altering the optical path length by altering the temperature of the material; or
the material being an electro-optic material and altering the optical path length by altering the index of refraction of the electro-optic material.

22. A method of claim 16, optimizing an operating point of an etalon used in an optical receiver, the method comprising:
receiving an input optical signal at the etalon;
accumulating optical signal energy within the etalon based at least in part on the input optical signal;
emitting an intensity-modulated output optical signal from the etalon, the intensity modulation of the output optical signal being representative of a modulation of the input optical signal;
identifying the modulation of the input optical signal based at least in part on the intensity modulation of the output optical signal; and
tuning an optical length of the etalon to optimize the operating point of the etalon based on characteristics of the input optical signal, wherein the etalon includes a pair of semi-reflective surfaces, and wherein tuning the optical length of the etalon includes applying a first control signal to alter one or more properties of a material interposed between the pair of semi-reflective surfaces to change the optical length of the etalon, wherein the pair of semi-reflective surfaces is configured to at least partially trap the optical signal energy in the material interposed between the pair of semi-reflective surfaces by reflecting a portion of optical signal energy between the pair of semi-reflective surfaces.

* * * * *